(No Model.)

T. H. CARTER.
BRAKE FOR SIDE BAR VEHICLES.

No. 521,459.           Patented June 19, 1894.

Witnesses
Harry L. Amer.
W. S. Duvall.

Inventor
Thomas H. Carter.
By his Attorneys.
C. A. Snow & Co.

UNITED STATES PATENT OFFICE.

THOMAS H. CARTER, OF WALNUT, MISSISSIPPI.

BRAKE FOR SIDE-BAR VEHICLES.

SPECIFICATION forming part of Letters Patent No. 521,459, dated June 19, 1894.

Application filed December 26, 1893. Serial No. 494,762. (No model.)

*To all whom it may concern:*

Be it known that I, THOMAS H. CARTER, a citizen of the United States, residing at Walnut, in the county of Tippah and State of Mississippi, have invented a new and useful Side-Bar-Vehicle Brake, of which the following is a specification.

My invention relates to improvements in vehicles, and has special reference to the brake-mechanism thereof.

The objects of my invention are to provide a very simple construction of brake-mechanism designed especially for use in connection with and application to light side-bar vehicles, whereby the vehicle is adapted for braking when used in connection with colts and also to relieve the horse in descending hills.

The average buggy-body or other similar light vehicle, is prevented from employing brakes and their necessary mechanism, in that their timbers would soon wrench loose by their use. By my invention, however, I propose to construct a brake especially adapted for this class of vehicles.

With this end in view my invention consists in a certain construction of brake hereinafter specified, and the same being applicable to the side-bars of vehicles so that the body proper is relieved of all strain by reason of their presence.

Other objects and advantages of the invention will appear in the following description, and the novel features thereof will be particularly pointed out in the claims.

Figure 1:
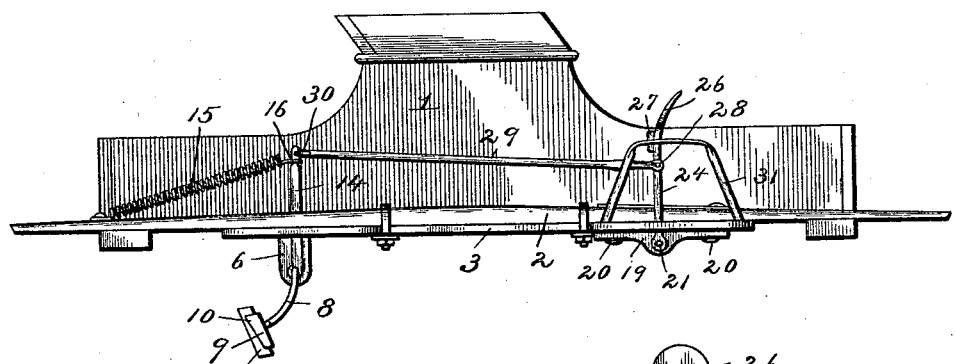
Figure 2:
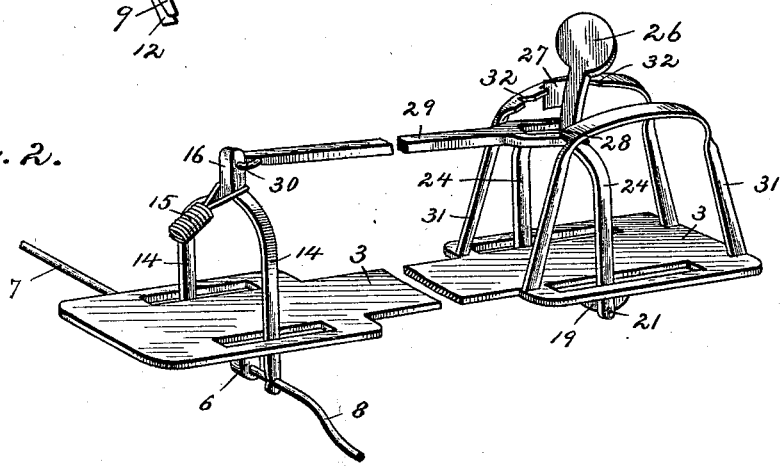
Figure 3:
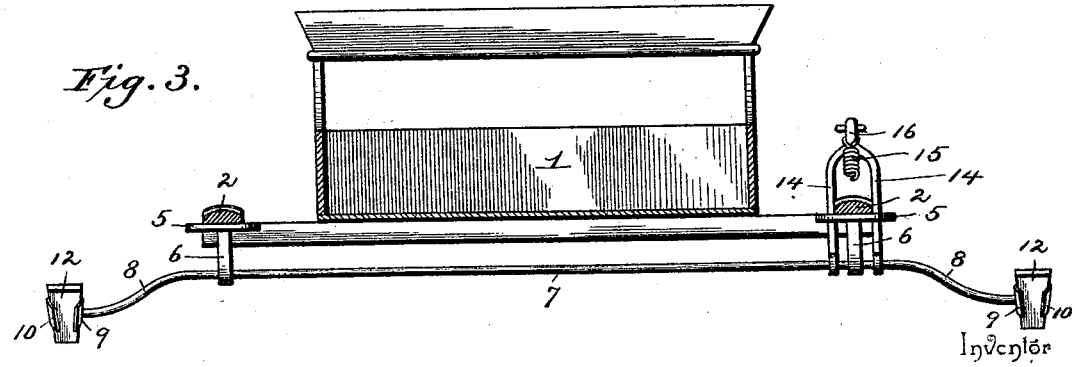

Referring to the drawings:—Figure 1 represents the body of a buggy or other light vehicle, the same being provided with a brake-mechanism embodying my invention. Fig. 2 is a detail of said brake-mechanism. Fig. 3 is a transverse sectional view through the rear end of vehicle-body.

Like numerals of reference indicate like parts in all the figures of the drawings.

The buggy-body 1 or it may be any other light vehicle, has at its opposite sides the side-bars 2 of the usual construction.

To the under side of the right hand side-bar I secure by clips an oblong metal plate 3, which is flared or widened toward its ends, the said widened ends being projected beyond the opposite sides of the side-bar and provided with longitudinal slots 4 in said projected sides. A bearing-plate 5 is also secured to the opposite side-bar upon the under side thereof, and transversely opposite the rear widened or flared end of the plate 3, and from the rear widened end of the plate 3 and the plate 5, depend bearing-standards 6, in which I journal the transverse brake-shaft 7, whose ends beyond the bearing-standards are cranked at 8 and provided with brake-shoes 9. These shoes 9 are constructed of sheet metal, and have their opposite side edges rearwardly bent at 10 and converged toward their lower ends, so that leather or other friction pads 12 may be inserted downward into the shoes between the flanges, and will be held in position by wedging between the same. When worn, they may be readily removed by withdrawing them upward and new pads inserted. An inverted U-shaped bail 14 embraces the right hand side-bar, and has its lower ends or terminals passed through the slots in the rear end of the plate 3 and made fast to the brake-shaft. The upper end of this bail is, by means of a coiled spring 15, secured to a fixed stud 16 near the rear end of the side-bar, which spring exerts a tendency to swing the bail to the rear, and thus remove the shoes from contact with the rims of the wheels.

A bearing-plate 19 is secured to the under side of the front extension of the plate 3 by means of screws 20, and located in the same is a transverse bearing-bolt 21, whose ends project beyond the opposite edges of the plate 19 and below the longitudinal slots formed in the extensions of the plate 3. A brake-lever 24 is bifurcated at its lower end and embraces the side-bar, the lower end of said lever being passed through the slots of the plate 3 and secured to the bearing-bolt. This brake-lever is provided at its upper end with a foot-plate 26 and at one side with a dog or pawl 27. It is also pivotally connected at 28 to a brake-bar 29, whose rear end is pivotally connected at 30 to the upper end of the pawl before described. A pair of inverted U-shaped guard rods 31 embrace the opposite sides of the side-bar 2 rising from the plate 3, and are located at opposite sides of the brake-lever opposite the dog or pawl. One of these guard-rods, namely, the one adjacent to the dog or pawl, is provided with a series of forwardly disposed inclined notches or teeth 32, with which said dog or pawl may engage, and hence the brake-lever locked in any desired position.

In order to apply the brakes, it is simply necessary to press the brake-lever forward, and the dog readily riding over the notches or teeth of the locking-bar or rod, and through the medium of the connecting-rod, the pawl will be swung forward and the crank-arms carrying the brake-shoes will swing the latter into contact with the wheels. The tension with which the brakes are applied may be readily regulated and the brakes locked on by engaging the dog with any one of the notches of the locking bar. By disengaging the pawl with the locking-bar, the spring serves to return the parts to their former position, and the brake-shoes are removed from contact with the wheels.

I propose to construct the brake in a light manner and of ornamental design, so that it will not detract from the symmetry of the vehicle nor add any material weight thereto.

From the foregoing description in connection with the accompanying drawings, it will be seen that I have provided a very simple construction of brake-mechanism, that is applicable to that class of light vehicles employing side-bars, and which have heretofore been unable to successfully employ brake-mechanisms by reason of the wrenching of the parts as caused by the operations of the brake.

Having described my invention, what I claim is—

1. The combination with the side-bar of a vehicle, of a plate secured to the under side thereof and provided with front and rear slots formed in lateral extensions projecting beyond the side-bar, a plate on the opposite side-bar near the rear end thereof, depending bearing standards on said plates, a transverse crank-shaft carrying brake-shoes, an inverted U-shaped bail located in the rear slots of the first-mentioned plate and secured to the crank-shaft, a spring for retracting the bail, a bearing-plate secured to the front end of the first-mentioned plate, a bifurcated lever having its terminals passed through the slots of the latter plate, a bearing-bolt arranged in the bearing-plate and connected to the terminals of the latter, a foot-plate at the upper end of the lever, a connecting-rod between the lever and the bail, a dog carried by the lever, and the opposite inverted U-shaped bars arranged on the extensions of the slotted plate and embracing the foot-lever, one of said bars having notches for engaging the dogs, substantially as specified.

2. The combination with the opposite side-bars of a vehicle, of the depending bearings arranged upon the side-bars, the transverse shaft arranged in the bearings and terminating in brake-shoes, a bail of inverted U-shape arranged on the rear end of the side-bar and secured at its terminals to the crank-shaft, a spring for retracting the bail, bearings near the front end of the side-bar, a transverse bolt arranged in the bearings, a bifurcated lever embracing the side-bar and secured to the bolt and terminating at its upper end in a foot-plate, and a connecting rod between the foot-lever and the bail, substantially as specified.

3. The combination with the side-bars of a vehicle, of bearings supported by the side-bar, a brake-shaft arranged in the bearings, a rock-arm carried by the brake-shaft, a brake-lever in front of the rock-arm and supported by the side-bar, means for locking the lever, and a connecting-bar between the two levers, substantially as specified.

4. In a brake-mechanism for side-bar vehicles, the plate 3 secured to the under side of the side-bar, the bail 14 embracing the side-bar and plate, the rock-shaft 7 mounted in the bail, the brake-devices carried by the rock-shaft, the brake-lever 24 also embracing the side-bar and plate, connections between the bail and the brake-lever, and means for adjusting the throw of the brake-lever, substantially as specified.

In testimony that I claim the foregoing as my own I have hereto affixed my signature in the presence of two witnesses.

THOMAS H. CARTER.

Witnesses:
JAMES M. RUTHERFORD,
HARVEY W. SMITH.